United States Patent [19]

Shibata et al.

[11] Patent Number: 4,809,115
[45] Date of Patent: Feb. 28, 1989

[54] MAGNETIC RECORDING AND REPRODUCING APPARATUS

[75] Inventors: Yoshihiro Shibata, Katsuta; Noboru Katohno, Mito; Hajime Yokota, Katsuta, all of Japan

[73] Assignee: Hitachi, Ltd., Tokyo, Japan

[21] Appl. No.: 74,785

[22] Filed: Jul. 17, 1987

[51] Int. Cl.[4] ............................................. G11B 33/12
[52] U.S. Cl. ................................... 360/137; 360/74.6; 360/60
[58] Field of Search .................. 360/137, 90, 93, 96.1, 360/96.4, 96.5, 86, 97–99, 72.1–72.3, 74.6, 60; 242/197, 199; 369/292; 361/399; 310/DIG. 6, 71; 250/231 SE

[56] References Cited

U.S. PATENT DOCUMENTS

| | | | |
|---|---|---|---|
| 4,216,512 | 8/1980 | Vidwans | 360/97 |
| 4,604,665 | 8/1986 | Müller et al. | 360/97 |
| 4,651,241 | 3/1987 | von der Heide et al. | 360/97 |

FOREIGN PATENT DOCUMENTS

| | | | |
|---|---|---|---|
| 55-67901 | 5/1980 | Japan | 360/137 |
| 59-207001 | 11/1984 | Japan | 360/137 |
| 61-134979 | 6/1986 | Japan | 360/137 |

Primary Examiner—John H. Wolff
Assistant Examiner—Matthew J. Bussan
Attorney, Agent, or Firm—Antonelli, Terry & Wands

[57] ABSTRACT

A light-emitting element and light-receiving elements are embedded upright in a single printed wiring board for cooperating with one another in detecting the leader tape portion of a magnetic tape. Such a printed wiring board is fixed to a chassis by means of which a magnetic tape cassette is held in position. This arrangement enables a reduction in the number of leads and connectors, and hence greatly decreases the number of connections to the body of a magnetic recording and reproducing apparatus, thereby improving its adaptability with respect to automated assembly.

2 Claims, 5 Drawing Sheets

MAGNETIC RECORDING AND REPRODUCING APPARATUS

BACKGROUND OF THE INVENTION

The present invention relates generally to a chassis arrangement for carrying the mechanism of a magnetic recording and reproducing apparatus, and more particularly to a chassis arrangement which contributes to improved productivity and is suitable for automated assembly.

FIG. 7 illustrates one example of a prior-art chassis arrangement for carrying the mechanism of a typical magnetic recording and reproducing apparatus which is a helical scan VTR (video tape recorder). As shown, the prior-art chassis arrangement typically includes: a cassette loading device 8; Hall elements 18, 19 for detecting the respective rotations of associated reels; a light-emitting element 20 and a light-receiving element 21a for cooperating with each other in detecting a transparent leader tape; a safety switch 23 for operatively detecting the safety lug of a tape cassette so as to prevent erroneous erasure of the recorded contents of a magnetic recording tape; a mode select switch 24 associated with various operating modes of the mechanism; cassette detecting switches 36, 37 for controlling the position and transportation of a tape cassette; connectors 40; and leads 41. As is evident from FIG. 7, a majority of the aforesaid components such as the detecting Hall elements 18, 19, the light-emitting element 20, the light-receiving element 21a, the safety switch 23, the mode select switch 24 and the cassette detecting switches 36, 37 are separately mounted on either the chassis for carrying the mechanism or the cassette loading device 8. These elements and switches are connected via a substrate and the connectors 40 to the leads 41 for signal communication with signal circuits, printed circuits and the like which are provided within the body of the apparatus. In this arrangement, the connectors 40 and the substrate must be connected to the individual positions occupied by the aforesaid detecting elements and switches, and this leads to the disadvantage that the amount of work involved increases accordingly. In addition, the arrangement of each individual lead needs to be considered, and in particular further consideration must be given to the arrangement of leads located adjacent to movable members of the mechanism. This in turn involves a remarkably large amount of work.

To obviate these disadvantages, Japanese Utility model Laid-open No. 23789/84 previously proposes a chassis for an electronic appliance comprising a framework made of sheet metal covered with an insulating layer on which a printed wiring pattern is formed. This arrangement involves remarkably expensive production costs, and in addition, if a portion of the wiring pattern formed in the chassis is broken or other similar drawbacks occur, once all the parts mounted on the chassis have been removed from such defective chassis, the chassis must be replaced with a new one, and thereafter, the thus-removed parts are again assembled with the new chassis. This may also offer a problem to efficient maintenance.

SUMMARY OF THE INVENTION

It is therefore an object of the present invention to provide a highly reliable chassis arrangement for carrying the mechanism of a magnetic recording and reproducing apparatus in which its connectors and leads can be reduced in number so as to reduce the amount of work involved in the production process and which is suitable for automated assembly, thereby contributing to improved productivity and efficient maintenance.

The aforementioned object is achieved by the present invention which providing a magnetic recording and reproducing apparatus comprising a light-emitting element and associated light-receiving elements that cooperate with one another in detecting the leader tape portion of a magnetic tape, such elements being upright and protrusively embedded in a single printed wiring board which is in turn fixed to a chassis by means of which a cassette is loaded at a predetermined position.

This arrangement enables a reduction in the number of leads and connectors, and hence greatly decreases the number of connections to the body of a magnetic recording and reproducing apparatus, thereby improving its adaptability with respect to automated assembly.

In a preferred embodiment of the present invention, in addition to the aforesaid light-emitting element and light-receiving elements for cooperating with one another in detecting the leader tape portion, the following components are also upright and protrusively disposed on the same printed wiring board: a detecting element for detecting the rotation of each reel, a switch for detecting a safety lug for preventing erroneous earsure of the recorded contents of a magnetic tape, a cassette position detecting switch, i.e., a switch for detecting two different positions of a cassette; one is a loaded position at which recording and reproduction are enabled while the other is a detachable position at which the cassette can be unloaded, and a mode select switch, i.e. a switch provided with positions corresponding to various operating modes of the apparatus.

Further objects, features and advantages of the present invention will become apparent from the following description of a preferred embodiment of the present invnetion with reference to the accompanying drawings.

DESCRIPTION OF THE PREFERRED EMBODIMENT

A preferred embodiment of the present invention will be described below with reference to FIGS. 1 to 6.

Figure 1:
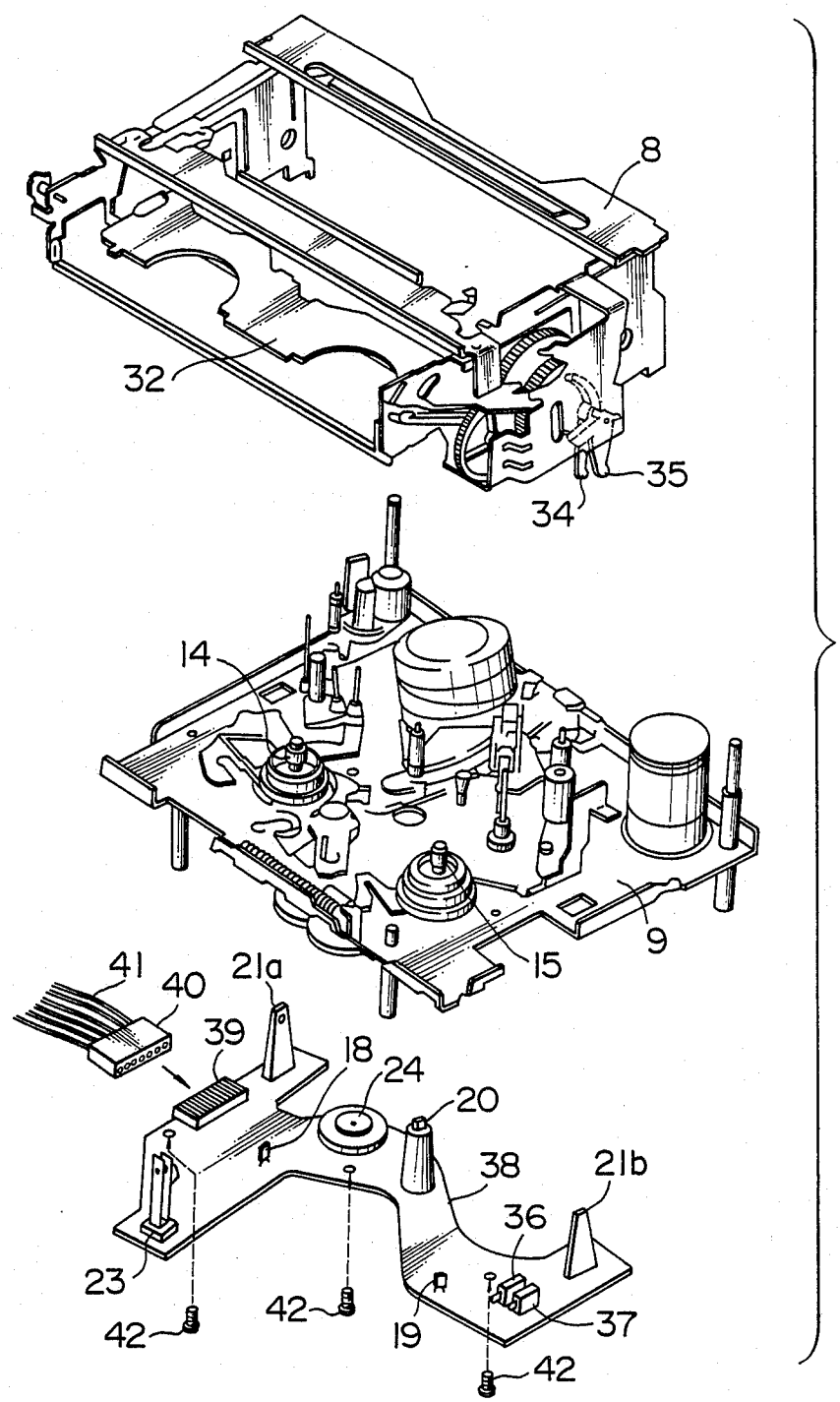
FIG. 1 is an exploded, perspective view diagrammatically showing one preferred embodiment of the VTR mechanism in accordance with the present invention.
Figure 2:
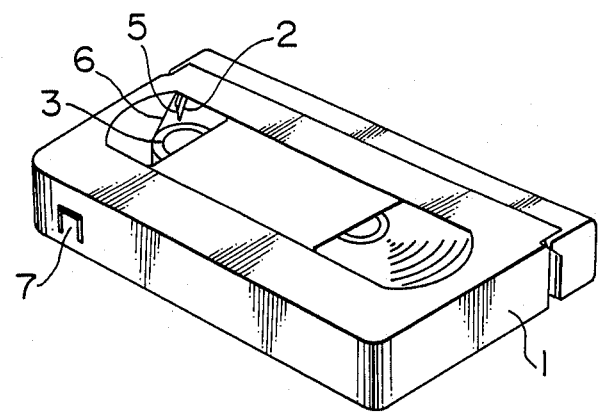
FIG. 2 is a perspective view of the appearance of a typical VHS type tape cassette.
Figure 3A:
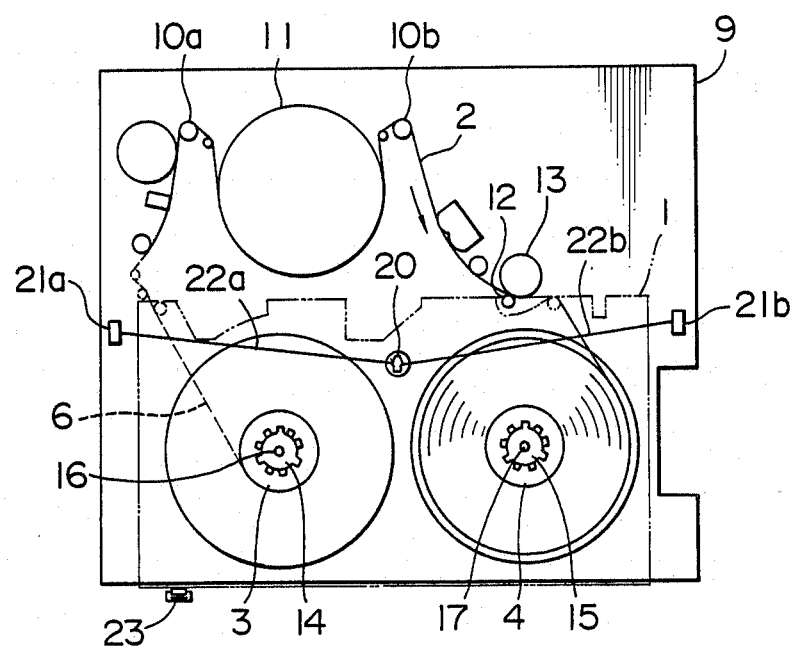
FIG. 3A is a top plan view diagrammatically showing the VTR mechanism of the embodiment of the present invention.
Figure 3B:
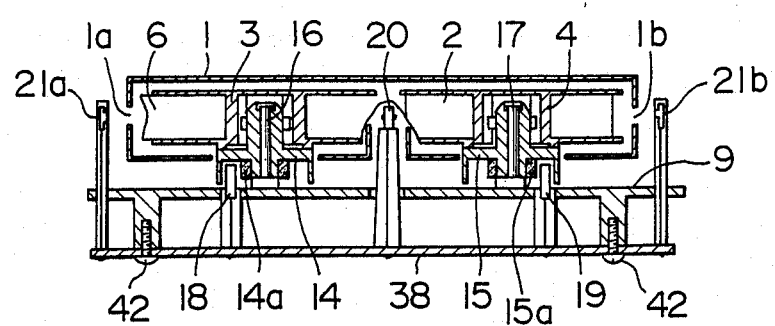
FIG. 3B is a longitudinal sectional view of the VTR mechanism shown in FIG. 3A but taken in the lateral direction as viewed in FIG. 3A, that is, n the direction in which a tape cassette is loaded and unloaded.
Figure 3C:
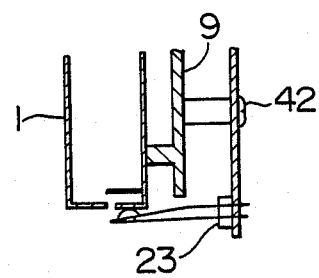
FIG. 3C is a fragmentary, longitudinal sectional view of the VTR mechanism shown in FIG. 3A but taken in the vertical direction as viewed in FIG. 3A, in which a tape cassette is inserted from the right side in FIG. 3C.

FIG. 1 is an exploded, perspective view diagrammatically showing the overall construction of the preferred embodiment of the present invention. FIG. 2 shows in perspective the appearance of a typical VHS type tape cassette used with the embodiment of a VHS type VTR in accordance with the present invention. FIG. 3A is a diagrammatic plan view of the mechanism of the embodiment of the VHS type VTR in accordance with the present invention. FIG. 3B is a longitudinal sectional view of the embodiment shown in FIG. 3A but taken in the lateral direction of FIG. 3A. FIG. 3C is a fragmentary sectional view of the same embodiment but taken in the vertical direction of FIG. 3A.

Referring to FIG. 2, a cassette 1 includes a pair of reels 3 and 4 between which a magnetic tape 2 is passed. The magnetic tape 2 has opposite terminal ends 5 connected to transparent leader taper portions 6, one of which is shown in FIG. 2. The cassette 1 has a safety lug 7 on its back side, and, in order to permanently store the contents which are recorded on the tape 2, the safety lug 7 may be snapped so as to prevent re-recording (re-erasing) in interlocking relationship with a safety switch which will be described later. The cassette 1 is transported by a cassette loading device, and then loaded in a predetermined position determined by a chassis 9 (the state shown in FIG. 3A).

The following is a description of the aforementioned elements and switches.

Referring specifically to FIGS. 3A, 3B and 3C, the magnetic tape 2 is drawn out of the cassette 1 by the cooperation between tape drawing members 10a and 10b provided on the chassis 9, and is in turn partially wrapped around a cylinder (rotary head drum) 11. The magnetic tape 2 in this state is fed through the cooperative rotation of a capstan 12 and a pinch roller 13 so that recording, reproduction or the like is effected. In the meantime and in synchronism with the aforesaid operation, a reel table 15 (or 14) is rotated under the drive of tape take-up means (not shown) provided on the chassis 9. A reel 4(3) engaged with the reel table 15 (14) is also rotated to wind therearound the magnetic tape 2 which is fed in the aforementioned manner. Also, a reel 3(4) on a tape supply side causes motion of the thus-fed magnetic tape 2 and hence the associated reel table 14 (15). The respective reel tables 14 and 15 are secured to spindles 16 and 17 disposed upright and protrusively on the chassis 9 for rotation in cooperation with the spindles 16 and 17. The respective reel tables 14 and 15 have at their lower portions permanent magnets 14a and 15a each having circumferentially equally spaced magnetic forces. Rotation detecting elements (Hall elements) 18 and 19 are respectively disposed in the vicinity of the permanent magnets 14a and 15a for periodically detecting the aforesaid magnetic forces, thereby detecting the rotations of the reels 3 and 4, that is, the feeding of the magnetic tape 2. The result of the thus-detected reel rotation is transmitted to the body of the apparatus in which it is utilized for the purposes of providing a counter indication and an indication of the amount of tape remaining to be played, or in the form of protective functions used at the time of occurrence of troubles (for example, if no rotation is detected over a predetermined period of time in a tape playing mode, the tape playing mode is cancelled and then a tape stop mode is selected).

Also, the cassette 1 has an opening through which the light-emitting element 20 is inserted, and light rays 22a and 22b emitted from the light-emitting element 20 pass through holes 1a and 1b on opposite sides of the cassette 1, and then detected by the light-receiving elements 21a and 21b, respectively.

Referring to FIG. 3A showing the wound-up state of the magnetic tape 2, the light ray 22a emitted from the light-emitting element 20 passes through the transparent leader tape portion 6, and is then detected by the light-receiving element 21a. In this case, since the light ray 22b directed to the light-receiving element 21b on the take-up side is blocked by the magnetic tape 2, the element 21b does not detect the light ray 22b. Signals representative of the states of detection assumed by both elements 21a and 21b are transmitted to the body of the apparatus, in which it is judged that tape winding is completed, and thus the apparatus assumes an auto-stop or auto-rewind state. In the state of fast-forward or fast-rewind (not shown) as well, the same operation as described above is effected so as to prevent an excessive force from acting upon the magnetic tape 2. In addition, the aforesaid operation is also utilized for the purpose of judging whether or not the cassette 1 is held in position.

The aforesaid safety switch 23 is disposed in face-to-face relationship with the safety lug 7 disposed on the cassette 1. If the safety lug 1 is present, the switch 23 is pressed by the safety lug 1 and the switch 23 is depressed to turn on the associated contacts. The thus-generated signal is transmitted to the body of the apparatus and thus recording is enabled. If the safety lug 1 has been snapped, that is, the safety lug 1 is absent, the contacts are maintained in an OFF state and thus recording (erasing) is made unable.

Figure 4:
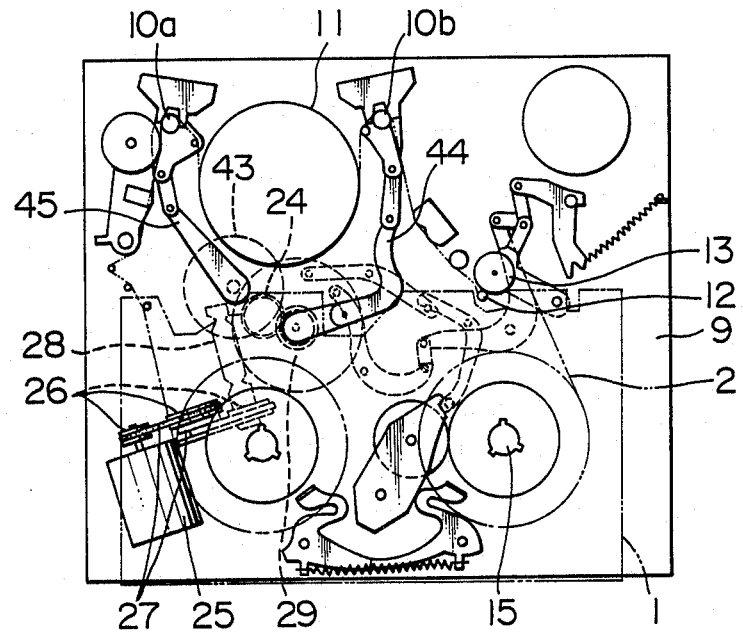
FIG. 4 is a diagrammatic plan view of the preferred embodiment of the VTR mechanism of the present invention.
Figure 5A:
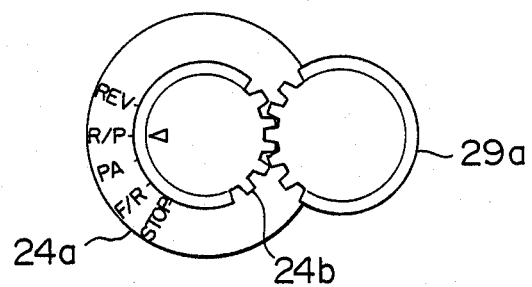
FIG. 5A is a detailed plan view of a portion of the embodiment shown in FIG. 4.
Figure 5B:
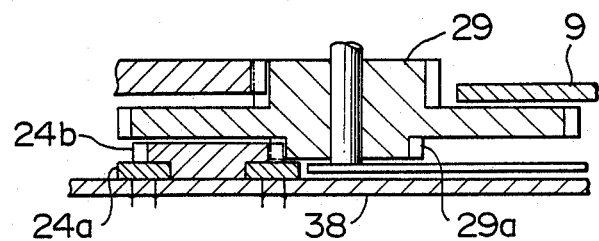
FIG. 5B is a longitudinal sectional view of the portion shown in FIG. 5A.

FIGS. 4, 5A and 5B show the mode select switch 24 having positions corresponding to various operating modes of the apparatus.

When an operating button (not shown) disposed on the body of the apparatus is depressed, a loading motor 25 is actuated in the forward or reverse direction, and rotation is transmitted to a drive gear 29 through a pulley 26, a belt 27 and a worm 28. The rotation is then transmitted to the mode select switch 24 via a gear portion 29a partially formed around the drive gear 29. The mode select switch 24 has a switch body 24a and the rotatable gear portion 24b which is meshed with the gear portion 29a of the drive gear 29. Also, the mode select switch 24 includes circumferentially arranged contacts equivalent in number to the operating modes of the mechanism so that a signal corresponding to the angle of rotation of the gear portion 24a is transmitted to the body of the apparatus. Also, the drive gear 29 has a cam groove (not shown) for engagement with one end of each arm member. As the drive gear 29 is being rotated, the arm members are activated to cause the mechanism to assume various operating modes. Rotation of the drive gear 29 and the drive gear 43 meshed therewith via links 44 and 45 causes movement of the aforesaid tape drawing members 10a and 10b to draw the magnetic tape 2 out of the cassette 1 thereby bringing the tape 2 in contact with the outer periphery of the cylinder 11. More specifically, when the drive gear 29 is rotated to a position corresponding to the operating mode which is selected through the aforesaid body of the apparatus, the mode switch transmits the associated signal to the body of the apparatus. In response to the signal, the body of the apparatus stops the motion of the loading motor 25.

Figure 6:
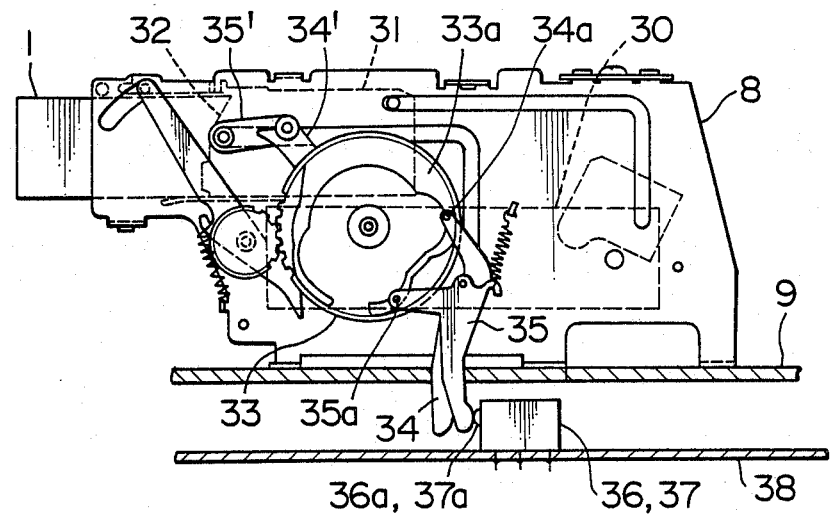
FIG. 6 is a longitudinal sectional view of a portion of a cassette loading device incorporated in the embodiment of the present invention.
Figure 7:
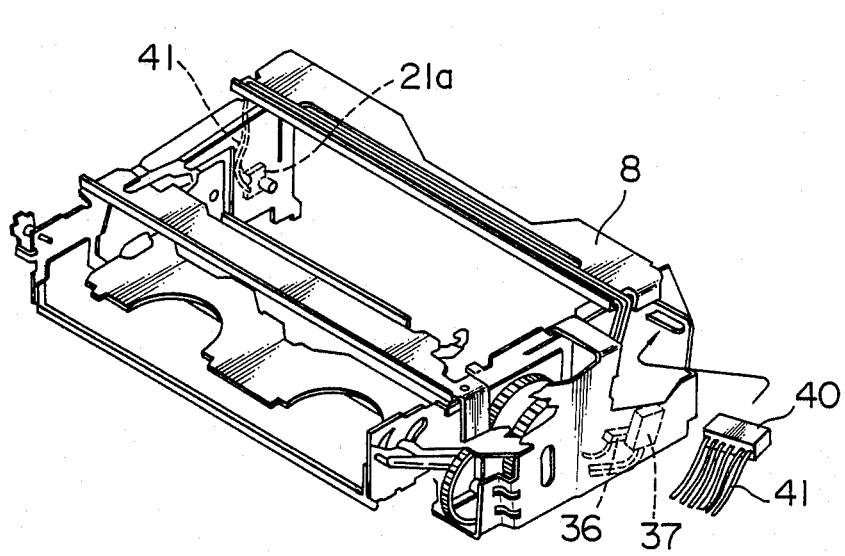
FIG. 7 is an exploded, perspective view of the overall construction of one example of a prior-art magnetic recording and reproducing apparatus.
Figure 7:
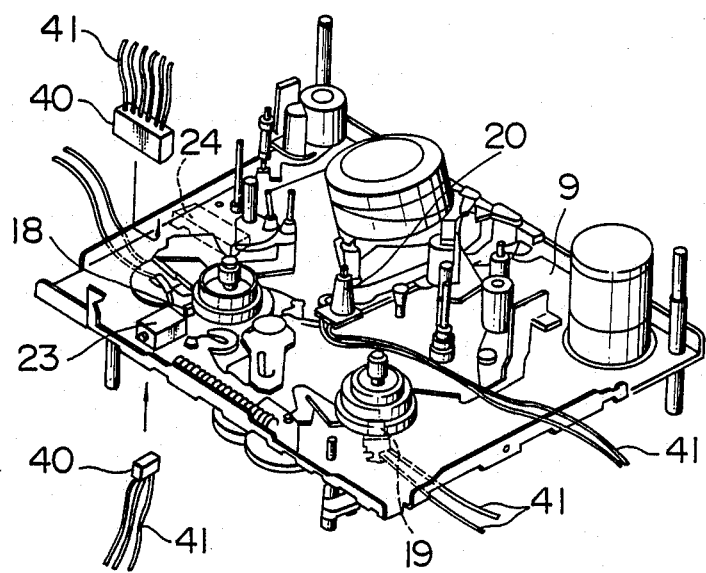

FIG. 6 shows cassette switches 36 and 37 for detecting two different positions of the cassette 1. A first position (a position at which the cassette 1 is held in place) is indicated at 30, and, at the first position 30, recording and reproduction can be effected. A second position (a position at which the cassette 1 becomes detachable) is indicated at 31, and, at the second position 31, the cassette 1 can be unloaded.

The cassette loading device 8 includes a gear 33 rotated under the drive of a motor (not shown) which differs from the motor 25, but the detailed description is omitted for the sake of simplicity. Rotation of the gear 33 causes movement of a cassette holder 32 for holding the cassette 1 through an arm 34' and a link 35', thereby moving the cassette holder 32 to and fro between the first and second positions. The gear 33 is provided with a cam groove 33a for engagement with each pin 34a and 35b attached to one end of each switch arm 34 and 35. The other ends of the switch arms 34 and 35 are disposed in opposed relationship with the cassette switches 36 and 37, respectively, for actuating push-type operating members 36a and 37a of the cassette switches 36 and 37. The position of the cassette 1 corresponds to the angle of rotation of the gear 33, and the switch arms 34 and 35 are respectively displaced in accordance with this angle of rotation to operate the cassette switches 36 and 37. The resultant signals are transmitted from the cassette switches 36 and 37 to the body of the apparatus, in which the position of the cassette 1 is judged using such signals.

As shown in FIG. 1, the aforesaid components such as the rotation detecting elements 18, 19, the light-emitting element 20, the light-receiving elements 21a, 21b, the safety switch 23, the mode select switch 24 and the cassette switches 36, 37 are disposed upright on a single printed wiring board by soldering. The signals produced at the respective elements, switches and the like are gathered together at a plug 39, and then transmitted to the body of the apparatus via the single connector 40 and the lead 41 extending therefrom. The printed wiring board 38 is fixed to the chassis 9 by bolts 42.

Accordingly, all of the aforesaid elements and switches are connected to the apparatus body at only one point, and this greatly reduces the amount of work involve in the production process. Also, since only one power source line suffices for a common power source line, the number of leads can be reduced. Since only one connecting point has to be formed when arranging the leads, the amount of work involved can be decreased. In addition, since no leads are disposed around the movable members of the mechanism, there is no risk of leads hindering the motions of the movable members, and this enhances the reliability of the mechanism.

Moreover, the printed wiring board 38 on which the respective elements and switches are disposed in an upright manner has no leads which might provide hindrance with respect to automated assembly. It is thus easy to automate mounting of the board 38 on the chassis 9.

Also, if any drawback such as a break in a pattern occurs in printed wiring, the printed wiring board 38 can be easily replaced by removing the bolts 42. This feature produces remarkable effects upon efficient maintenance.

Of course, it is possible to mount on the printed wiring board 38 various motors associated with the operation of the mechanism and various heads for allowing for signal communication in addition to the elements and switches used in the presently preferred embodiment.

As described in detail above with reference to the preferred embodiment which is not construed as being exclusive, in the magnetic recording and reproducing apparatus in accordance with the present invention, the light-emitting element and the light-receiving elements for cooperating with one another in detecting a leader tape portion are at least disposed in an upright manner on the same printed wiring board and such board is fixed to the chassis, thereby accomplishing a decrease in the number of connectors and leads and hence a reduction in the amount of work involved in the production process. This succeeds in providing a low-cost mechanism of a magnetic recording and reproducing apparatus which has suitability for automated assembly, high reliability and facilitates efficient maintenance such as replacement of the printed wiring board or other components.

What is claimed is:

1. In a magnetic recording and/or reproducing apparatus arranged to employ a magnetic tape cassette having a pair of magnetic tape reels and two leader tape portions, each connected to a respective terminal end of a magnetic tape, the improvement comprising one light-emitting element and two light-receiving elements disposed upright on the same printed wiring board for cooperating with one another in detecting said leader tape portions, and one plug mounted also on said printed wiring board and electronically connected to said light-emitting element and said light-receiving elements, said printed wiring board being fixed on a chassis rotatably supporting a pair of reel tables which engage with said reels when said magnetic tape cassette is placed in a recording or reproducing position.

2. In a magnetic recording and/or reproducing apparatus arranged to employ a magnetic tape cassette including a pair of magnetic tape reels, two leader tape portions, each connected to a respective terminal end of magnetic tape and a safety lug for preventing erroneous erasure of the recorded contents of said magnetic tape, the improvement comprising:

detecting elements for detecting the rotation of each said reel;

one light-emitting element and two light-receiving elements for cooperating with one another in detecting said leader tape portions;

switch means for detecting said safety lugs;

a common printed wiring board on which all of said elements and means are disposed in an upright manner; and one plug mounted also on said common printed wiring board and electrically connected to said light-emitting element and said light-receiving elements, said common printed wiring board being fixed on a chassis rotatably supporting a pair of reel tables which engage with said reels when said magnetic tape cassette is placed in a recording or reproducing position.

* * * * *